Jan. 20, 1953 J. J. CAMPBELL 2,626,178

TOOL FOR GRIPPING FISH AND OTHER OBJECTS

Filed Aug. 9, 1950

INVENTOR

John J. Campbell

Patented Jan. 20, 1953

2,626,178

UNITED STATES PATENT OFFICE 2,626,178

TOOL FOR GRIPPING FISH AND OTHER OBJECTS

John J. Campbell, Toronto, Ontario, Canada

Application August 9, 1950, Serial No. 178,444

1 Claim. (Cl. 294—117)

In fishing it is often very difficult to hold a newly caught fish without hurting the hands while the hook is being disengaged from the mouth of the fish, and the object of the present invention is to devise a tool which may be conveniently operated by one hand which will grip the fish sufficiently firmly to enable the hook to be disengaged by the other hand, and which may be used to firmly grip fish of different sizes without having to adjust the tool.

Figure 1:
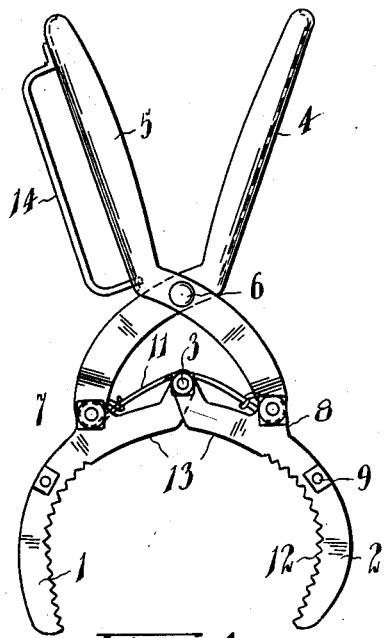
Figure 2:
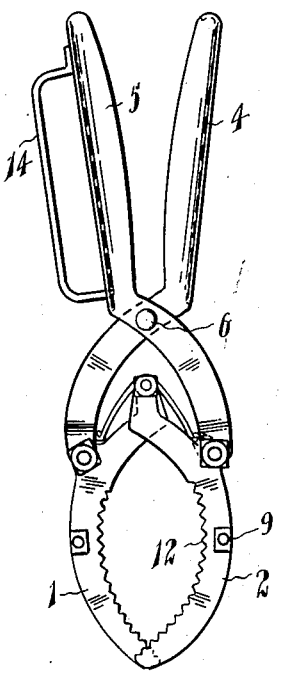

This object is attained by means of the constructions hereinafter described and illustrated in the accompanying drawings in which Fig. 1 is a plan view of the tool with the gripping jaws open;

Fig. 2 is a similar view showing the jaws in gripping position; and

Figure 3:
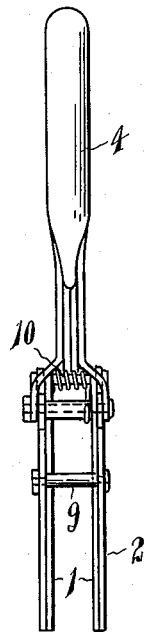

Fig. 3 a side view of the tool.

In the drawings like numerals of reference indicate corresponding parts in the different figures.

The tool comprises a pair of gripping jaws 1 and 2 of arc-shape in plan with their concave edges facing one another. These jaws are pivoted together at one end by a pin 3.

These jaws are moved into and out of fish-engaging position by means of a pair of levers 4 and 5 which are pivoted together at 6 intermediate their ends in X formation, one end of the lever 4 being pivotally connected at 7 with a projection on the outer side of the jaw 1, while the corresponding end of the lever 5 is pivotally connected at 8 with a similar projection on the outer side of the jaw 2.

The jaws 1 and 2 are both formed of two similarly shaped plates which are held in spaced relationship by spacers 9 as well as by the pivots 3, 7 and 8. The plates of the jaw 1 are spaced slightly closer together than the plates of the jaws 2, so that the jaw 1 may move between the parts of the jaw 2 as indicated in Fig. 2. The jaw-supporting ends of the levers 4 and 5 are forked to engage the plates of the respective jaws.

A coil spring 10 is mounted on the pivot 3 and has spring arms 11 projecting therefrom, one engaging the pivot 7 and the other the pivot 8 and tending to move the jaws to open position as shown in Fig. 1.

The inner edge of the jaw plates are provided with teeth 12. The portion 13 of the edge of the jaw plates nearest the pivot 3 is left without teeth.

The other end of each lever 4 and 5 is formed as a handle, and in addition the handle end of the lever 5 is provided with a guard 14 to prevent the fingers slipping from the tool when gripping a fish.

It will be seen that the tool provides a secure grip on the fish while a hook is being disengaged from its mouth, and that due to the gripping jaws being adapted to be overlapped, fish of various sizes may readily be held with the tool.

While the tool has been devised primarily for gripping fish, it will be evident, of course, it may be used for gripping other objects for which it may be suitable.

What is claimed is:

A gripping tool for the purpose set forth comprising a pair of gripping jaws pivoted together at one end and having opposed arc-shaped gripping surfaces, each jaw comprising a pair of plates and means remote from the free ends of the jaws for holding the plates in spaced relationship, the plates of one jaw being arranged in different planes than those of the other jaw to permit their free ends to pass one another in overlapping relationship, the gripping edges of said plates being serrated; a pair of crossed levers pivotally connected intermediate their ends, said levers each having one end pivotally connected with a jaw at a distance from the connecting pivot of the jaws, the other end of each lever forming a hand grip, and spring means tending to hold the jaws in open position, said spring means comprising a coil mounted on the pivot connection of the jaws and arms extending from the coil and engaging the pivots between the levers and the jaws between the spaced plates of the latter.

JOHN J. CAMPBELL.

REFERENCES CITED

The following references are of record in the file of this patent:

UNITED STATES PATENTS

| Number | Name | Date |
| --- | --- | --- |
| 97,171 | De Grummond | Nov. 23, 1869 |
| 472,459 | Langford | Apr. 5, 1892 |
| 618,873 | Harper | Feb. 7, 1899 |
| 876,213 | Moore | Jan. 7, 1908 |
| 1,009,760 | Loreman | Nov. 28, 1911 |
| 1,174,175 | Moster | Mar. 7, 1916 |
| 1,877,974 | Robb | Sept. 20, 1932 |
| 2,531,987 | Pilliod | Nov. 28, 1950 |